(12) United States Patent
Chen

(10) Patent No.: US 8,200,997 B2
(45) Date of Patent: Jun. 12, 2012

(54) COMPUTER WAKE UP CIRCUIT INCLUDES A SWITCH CONFIGURED TO PREVENT A CONTROL SIGNALS FROM AN I/O CONTROLLER BEING TRANSMITTED TO SOUTH-BRIDGE

(75) Inventor: Qi-Jie Chen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 363 days.

(21) Appl. No.: 12/548,063

(22) Filed: Aug. 26, 2009

(65) Prior Publication Data
US 2010/0306557 A1 Dec. 2, 2010

(30) Foreign Application Priority Data
May 27, 2009 (CN) .......................... 2009 1 0302685

(51) Int. Cl.
*G06F 1/00* (2006.01)
*G06F 1/32* (2006.01)

(52) U.S. Cl. ......... 713/300; 713/310; 713/320; 713/323

(58) Field of Classification Search .................. 713/300, 713/310, 320, 323
See application file for complete search history.

(56) References Cited

U.S. PATENT DOCUMENTS

| | | | | |
|---|---|---|---|---|
| 5,805,910 A | * | 9/1998 | Lee et al. | 713/323 |
| 6,571,341 B1 | * | 5/2003 | Forbes | 713/323 |
| 7,757,106 B2 | * | 7/2010 | Liu | 713/300 |
| 2004/0128571 A1 | * | 7/2004 | Saunders et al. | 713/300 |

* cited by examiner

*Primary Examiner* — Vincent Tran
(74) *Attorney, Agent, or Firm* — Altis Law Group, Inc.

(57) ABSTRACT

A computer wake up circuit includes a first control circuit and a second control circuit. The first control circuit has an input terminal configured to receive a first control signal from a first serial device, and an output terminal coupled to a south bridge which is capable of waking up a computer. The second control circuit has an input terminal respectively coupled to a second serial device and an I/O controller, and an output terminal coupled to the south bridge. The second control circuit receives a second control signal from the second serial device. The first and second control circuits respectively outputs a wake up signal to the south bridge to wake up the computer according to the control signals. The I/O controller communicates with the second serial device through the second control circuit, and outputs other control signals to control operations of the second serial device.

14 Claims, 2 Drawing Sheets

COMPUTER WAKE UP CIRCUIT INCLUDES A SWITCH CONFIGURED TO PREVENT A CONTROL SIGNALS FROM AN I/O CONTROLLER BEING TRANSMITTED TO SOUTH-BRIDGE

BACKGROUND

1. Technical Field

The present disclosure relates to a computer wake up circuit, and particularly to a computer wake up circuit used for multiple serial devices waking up a computer from a sleep state.

2. Description of Related Art

With the rapid development of personal computers, development of high performance components of a computer have brought about a corresponding increase in power use. Therefore, wasting of power becomes more likely if the computer is not changed to a power saving state when not in use. Typically, a wake up circuit is included when designing computer power management for solving the above problem. There is usually a sleep/awake button on a keyboard of a computer that is connected to the inner wake up circuit of a motherboard of the computer. The button is pressed by a user for putting the computer to sleep. Then when the user wishes, presses the same button again to wake up the computer.

The typical wake up circuit receives control signals from the sleep/awake button or peripheral devices to wake the computer from a sleep state. However, different peripheral devices may output different control signals. Some of the peripheral devices output special control signals that are not compatible with the wake up circuit. The wake up circuit sometimes cannot respond to the special control signal effectively to wake up the computer. Also, the control signals from the peripheral devices may be easily influenced by control signals from other chipsets and noise signals, which the cause the wake up circuit to fail.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
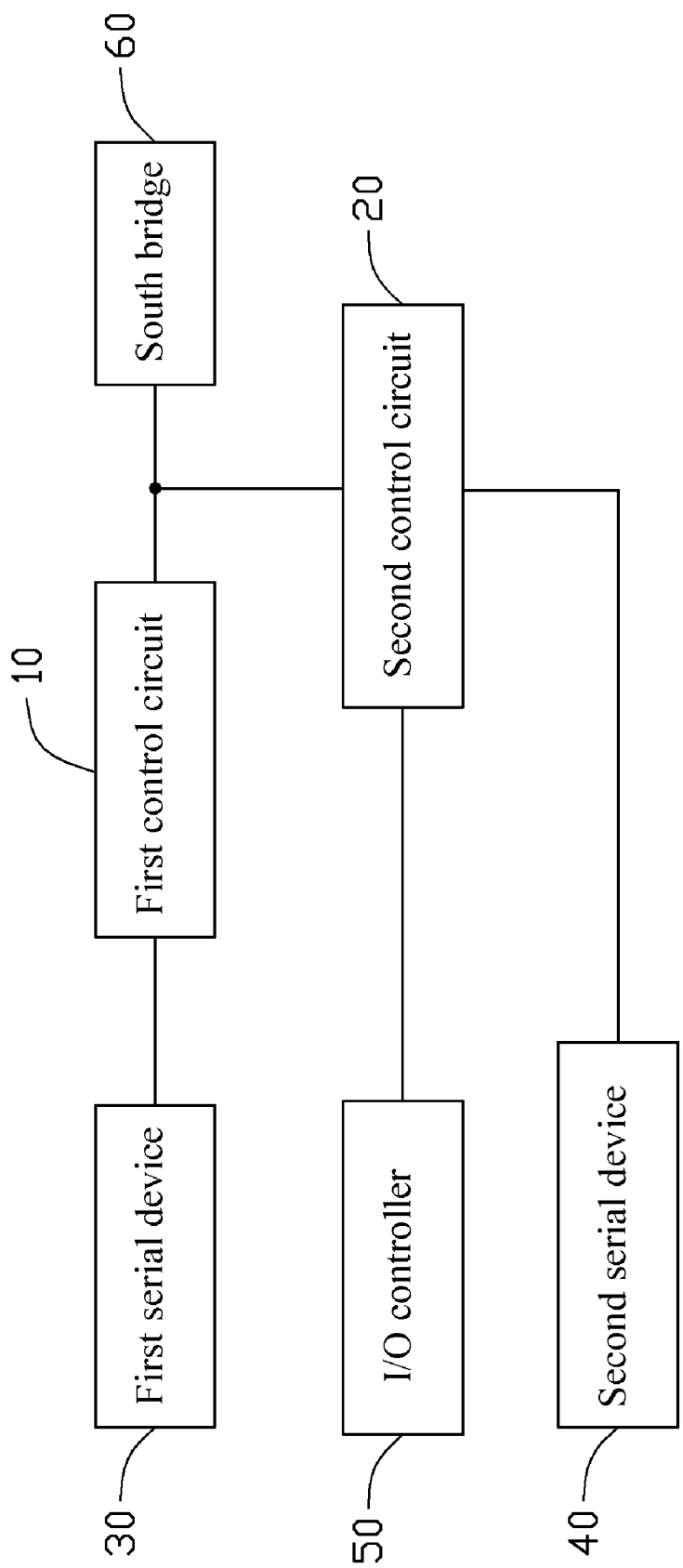
FIG. 1 is a block diagram of a computer wake up circuit.

Referring to FIG. 1, a computer wake up circuit includes a first control circuit 10, and a second control circuit 20. The first control circuit 10 has an input terminal configured to receive a first control signal from a first serial device 30, and an output terminal coupled to a south bridge 60 which is capable of waking up a computer (not shown). The second control circuit 2 has an input terminal coupled to a second serial device 40 and an I/O controller 50, and an output terminal coupled to the south bridge 60. The second control circuit 20 receives a second control signal from the second serial device 40.

Figure 2:
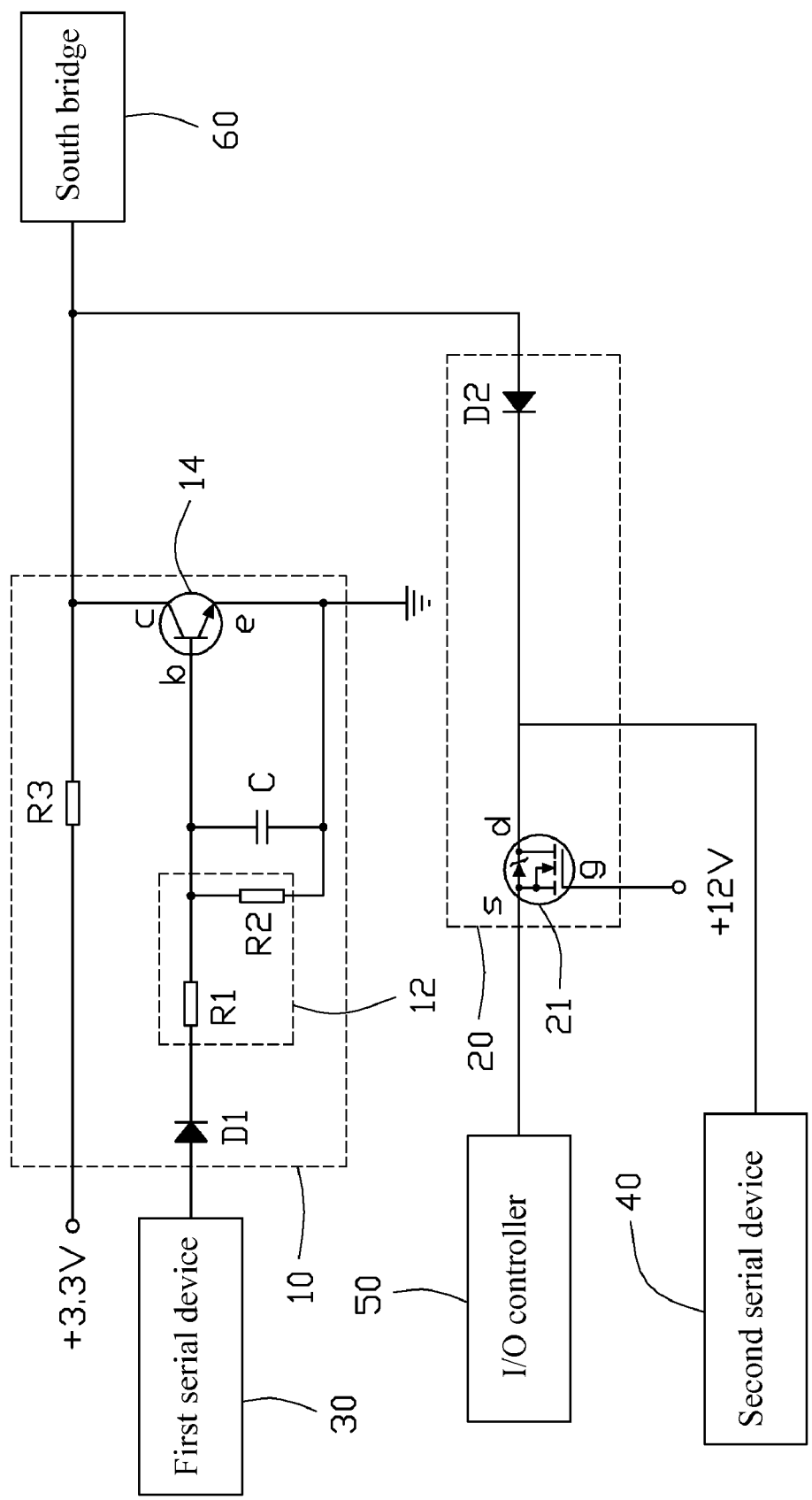
FIG. 2 is a circuit diagram of the computer wake up circuit of FIG. 1.

Referring to FIG. 2, the first control circuit 10 includes a diode D1, a voltage sampling circuit 12, a filter capacitor C, and a switch 14. The diode D1 anode receives the first control signal via the first control circuit 10 input terminal. The diode D1 cathode is coupled to the voltage sampling circuit 12 input terminal. The voltage sampling circuit 12 output terminal is coupled to the filter capacitor C first terminal, and is coupled to the switch 14 input terminal. The switch 14 output terminal is coupled to the south bridge 60 via the first control circuit 10 output terminal. The voltage sampling circuit 12 includes two resistors R1, R2. The resistor R1 first terminal is coupled to the diode D1 cathode via the voltage sampling circuit 12 input terminal. The resistor R1 second terminal is coupled to the resistor R2 first terminal. The resistor R2 second terminal is grounded. The resistors R1 and R2 connection point is coupled to the filter capacitor C first terminal via the voltage sampling circuit 12 output terminal. The filter capacitor C second terminal is grounded. In this embodiment, the switch 14 is an NPN type transistor. The transistor base is coupled to the filter capacitor C first terminal via the switch 14 input terminal. The transistor collector is coupled to the south bridge 60 via the switch 14 output terminal, and is coupled to a 3.3 volts power supply via a resistor R3. The transistor emitter is grounded.

The second control circuit 20 includes a switch 21, and a diode D2. The switch 21 input terminal is coupled to the I/O controller 50 via the second control circuit 20 input terminal. The switch 21 output terminal is coupled to the diode D2 cathode. The diode D2 anode is coupled to the south bridge 60 via the second control circuit 20 output terminal. The switch 21 output terminal and the diode D2 cathode connection point is coupled to the second serial device 40. In this embodiment, the switch 21 is an N-channel MOSFET. The MOSFET source is coupled to the I/O controller 50 via the switch 21 input terminal. The MOSFET drain is coupled to the diode D2 cathode via the switch 21 output terminal. The MOSFET gate is coupled to a 12 volt power supply.

The first and second serial devices 30, 40 are different types serial devices. The first serial device 30 outputs a high level first control signal to wake up the computer (not shown) from a sleep state. The second serial device 40 outputs a lower level second control signal to wake up the computer (not shown) from a sleep state. The I/O controller 50 communicates with the second serial device 40 through the second control circuit 20, and outputs other control signals to control operations of the second serial device 40.

In use, when the computer (not shown) is in a sleep state, and the first serial device 30 outputs a high level first control signal. The voltage sampling circuit 12 converts the high level first control signal to a voltage signal, and outputs the voltage signal to the filter capacitor C. The filter capacitor C receives the voltage signal from the voltage sampling circuit 12, and outputs a filtered voltage signal to the switch 14. The switch 14 turns on to output a low level wake up signal to the south bridge 60. The computer (not shown) is woken up from the sleep state.

When the computer (not shown) is in a sleep state, and the second serial device 40 outputs a low level second control signal, and the I/O controller 50 also outputs a low level control signal at the same time. The switch 21 turns on to output a low level wake up signal to the south bridge 60. The computer (not shown) is woken up from the sleep state.

When the computer (not shown) is in a sleep state, and the second serial device 40 outputs a high level second control signal, and the I/O controller 50 outputs a low level control signal at the same time. The switch 21 turns off, and the low level signal cannot be output to the south bridge 60. The computer (not shown) cannot be woken up from the sleep state. However, the computer wake up circuit respectively receives the first and second control signals from the first and second serial devices 30, 40, and outputs low level signals to the south bridge 60 respectively to wake up the computer (not shown). The computer wake up circuit disclosed is effective for different types of serial devices. Further, the switch 21 isolates the signals from the I/O controller 50 and the second control signal from the second serial device 40 thereby avoiding interference between the control signals and failure of the circuit is avoided.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer wake up circuit, comprising:
   a first control circuit comprising an input terminal configured to receive a first control signal from a first serial device, and an output terminal coupled to a south bridge which is capable of waking up a computer; and
   a second control circuit comprising an input terminal respectively coupled to a second serial device and an I/O controller, and an output terminal coupled to the south bridge; the second control circuit is configured to receive a second control signal from the second serial device;
   wherein the first and second control circuits respectively are configured to output a wake up signal to the south bridge to wake up the computer according to the control signals, the I/O controller is configured to communicate with the second serial device through the second control circuit and to output other control signals to control operations of the second serial device; the second control circuit comprising a first switch capable of preventing the control signals from the I/O controller being transmitted to the south bridge.

2. The computer wake up circuit of claim 1, wherein the first control circuit comprises a first diode, a voltage sampling circuit, and a second switch, the first diode anode is capable of receiving the first control signal via the first control circuit input terminal, the first diode cathode is coupled to the voltage sampling circuit input terminal, the voltage sampling circuit output terminal is coupled to the second switch input terminal, the second switch output terminal is coupled to the south bridge via the first control circuit output terminal.

3. The computer wake up circuit of claim 2, wherein the first control circuit further comprises a filter capacitor coupled between the voltage sampling circuit and the second switch.

4. The computer wake up circuit of claim 3, wherein the voltage sampling circuit comprises a first resistor, and a second resistor, the first resistor first terminal is coupled to the first diode cathode via the voltage sampling circuit input terminal, the first resistor second terminal is coupled to the second resistor first terminal, the second resistor second terminal is grounded, the first and second resistors connection point is coupled to the filter capacitor first terminal via the voltage sampling circuit output terminal, the filter capacitor second terminal is grounded.

5. The computer wake up circuit of claim 4, wherein the second switch is a NPN type transistor, the transistor base is coupled to the filter capacitor first terminal via the second switch input terminal, the transistor collector is coupled to the south bridge via the second switch output terminal, and is coupled to a first power supply via a third resistor, the transistor emitter is grounded.

6. The computer wake up circuit of claim 1, wherein the second control circuit further comprises a second diode, the first switch input terminal is coupled to the I/O controller via the second control circuit input terminal, the first switch output terminal is coupled to the second diode cathode, the second diode anode is coupled to the south bridge via the second control circuit output terminal, the first switch output terminal and the second diode cathode connection point is coupled to the second serial device.

7. The computer wake up circuit of claim 6, wherein the first switch is a N-channel MOSFET, the MOSFET source is coupled to the I/O controller via the first switch input terminal, the MOSFET drain is coupled to the second diode cathode via the first switch output terminal, the MOSFET gate is coupled to a second power supply.

8. A computer wake up circuit, comprising:
   a first control circuit comprising an input terminal, configured to receive a first control signal from a first serial device, and an output terminal, coupled to a south bridge which is capable of waking up a computer; and
   a second control circuit comprising an input terminal, configured to receive a second control signal from a second serial device, and an output terminal, coupled to the south bridge;
   wherein the first and second control circuits respectively are configured to output a wake up signal to the south bridge to wake up the computer according to the control signals, the second control circuit comprising a first switch capable of preventing influence of interference signals to avoid wrongly waking up the computer; and the first serial device and the second serial device are configured to wake up the computer by control signals of different voltage levels.

9. The computer wake up circuit of claim 8, wherein the first control circuit comprises a first diode, a voltage sampling circuit, and a second switch, the first diode anode receives the first control signal via the first control circuit input terminal, the first diode cathode is coupled to the voltage sampling circuit input terminal, the voltage sampling circuit output terminal is coupled to the second switch input terminal, the second switch output terminal is coupled to the south bridge via the first control circuit output terminal.

10. The computer wake up circuit of claim 9, wherein the second control circuit further comprises a second diode, the first switch input terminal is coupled to an I/O controller via the second control circuit input terminal, the first switch output terminal is coupled to the second diode cathode, the second diode anode is coupled to the south bridge via the second control circuit output terminal, the first switch output terminal and the second diode cathode connection point is coupled to the second serial device.

11. The computer wake up circuit of claim 8, wherein the first serial device and the second serial device are different types of serial devices; the first serial device is configured to wake up the computer by a level first control signal; and the second serial device is configured to wake up the computer by a level second control signal; and a voltage level of the first control signal is higher than a voltage level of the second control signal.

12. The computer wake up circuit of claim 9, wherein the first control circuit further comprises a filter capacitor coupled between the voltage sampling circuit and the second switch.

13. The computer wake up circuit of claim 12, wherein the voltage sampling circuit comprises a first resistor, and a second resistor, a first terminal of the first resistor is coupled to the first diode cathode via the voltage sampling circuit input terminal, a second terminal of the first resistor is coupled to a first terminal of the second resistor, a second terminal of the second resistor is grounded, a connection point of the first resistor and the second resistor is coupled to a first terminal of the filter capacitor via the voltage sampling circuit output terminal, a second terminal of the filter capacitor is grounded.

14. The computer wake up circuit of claim 13, wherein the second switch is an NPN type transistor, the transistor base is coupled to the first terminal of the filter capacitor via an input terminal of the second switch, the transistor collector is coupled to the south bridge via an output terminal of the second switch, the transistor collector is coupled to a first power supply via a third resistor, and the transistor emitter is grounded.

* * * * *